United States Patent
Hahn et al.

(10) Patent No.: US 9,330,693 B1
(45) Date of Patent: May 3, 2016

(54) SUSPENSION CIRCUIT TRACE EMPLOYING STACKED TRACES AND WINDOWED STAINLESS STEEL LAYER

(71) Applicant: Magnecomp Corporation, Murrieta, CA (US)

(72) Inventors: Peter Hahn, Bangkok (TH); Benjapa Tanampee, Ayutthaya (TH); Jatuporn Nakarpha, Ayutthaya (TH); Christopher G. Dunn, Austin, TX (US)

(73) Assignee: MAGNECOMP CORPORATION, Murrieta, CA (US)

( * ) Notice: Subject to any disclaimer, the term of this patent is extended or adjusted under 35 U.S.C. 154(b) by 0 days.

(21) Appl. No.: 14/491,323

(22) Filed: Sep. 19, 2014

Related U.S. Application Data

(60) Provisional application No. 61/883,339, filed on Sep. 27, 2013.

(51) Int. Cl.
*G11B 5/48* (2006.01)

(52) U.S. Cl.
CPC ........ *G11B 5/48* (2013.01); *G11B 5/486* (2013.01); *G11B 5/4846* (2013.01); *G11B 5/4853* (2013.01); *G11B 5/484* (2013.01)

(58) Field of Classification Search
USPC ........................................................ 360/245.8
See application file for complete search history.

(56) References Cited

U.S. PATENT DOCUMENTS

| | | | |
|---|---|---|---|
| 5,796,552 A | 8/1998 | Akin, Jr. et al. | |
| 5,995,328 A * | 11/1999 | Balakrishnan | 360/245.9 |
| 6,295,183 B1 | 9/2001 | Nuno et al. | |
| 6,333,139 B1 | 12/2001 | Omote et al. | |
| 6,424,500 B1 | 7/2002 | Coon et al. | |
| 6,493,190 B1 | 12/2002 | Coon | |
| 6,714,385 B1 * | 3/2004 | Even et al. | 360/246 |
| 6,900,967 B1 | 5/2005 | Coon et al. | |
| 7,408,744 B1 | 8/2008 | Cuevas | |
| 7,518,830 B1 | 4/2009 | Panchal et al. | |
| 7,660,074 B1 * | 2/2010 | Webb et al. | 360/245.8 |
| 8,189,297 B2 * | 5/2012 | Arai | 360/246 |
| 8,462,464 B1 | 6/2013 | Dunn | |
| 8,553,364 B1 | 10/2013 | Schreiber et al. | |
| 2002/0181156 A1 * | 12/2002 | Shiraishi et al. | 360/245.9 |
| 2010/0157482 A1 * | 6/2010 | Hirata | 360/245.8 |
| 2011/0058281 A1 * | 3/2011 | Arai et al. | 360/245.9 |

* cited by examiner

*Primary Examiner* — Carlos E Garcia
(74) *Attorney, Agent, or Firm* — Intellectual Property Law Offices of Joel Voelzke, APC

(57) ABSTRACT

An electrical circuit for a disk drive suspension has a first signal trace above a grounded support layer which is typically stainless steel, and a second signal trace below the support layer, the two signal traces typically being opposite polarities of a differential signal pair. The support layer between the two signal traces is windowed, and the two traces are physically separated by a distance that equals the nominal thickness of the support layer plus the thicknesses of the top and bottom dielectric layers that separate the signal traces from the support layer. The physical separation combined with the windowing reduces the impedance and increases the bandwidth of the differential pair. The impedance can be controlled by the percentage of windowing in the support layer.

19 Claims, 6 Drawing Sheets

SUSPENSION CIRCUIT TRACE EMPLOYING STACKED TRACES AND WINDOWED STAINLESS STEEL LAYER

CROSS-REFERENCE TO RELATED APPLICATIONS

This application claims priority from U.S. provisional patent application No. 61/883,339 dated Sep. 27, 2013.

BACKGROUND OF THE INVENTION

1. Field of the Invention

This invention relates to the field of suspensions for disk drives. More particularly, this invention relates to the field of a suspension including a circuit trace constructed of circuit layers on opposite sides of a stainless steel layer, where the stainless steel layer have windows formed therein to allow passage of electric fields between the circuit layers.

2. Description of Related Art

Magnetic hard disk drives and other types of spinning media drives such as optical disk drives are well known. FIG. 1 is an oblique view of an exemplary prior art hard disk drive and suspension for which the present invention is applicable. The prior art disk drive unit 100 includes a spinning magnetic disk 101 containing a pattern of magnetic ones and zeroes on it that constitutes the data stored on the disk drive. The magnetic disk is driven by a drive motor (not shown). Disk drive unit 100 further includes a disk drive suspension 105 to which a magnetic head slider (not shown) which defines a read/write head is mounted proximate a distal end of load beam 107. The "proximal" end of a suspension or load beam is the end that is supported, i.e., the end nearest to base plate 12 (FIG. 2) which is swaged or otherwise mounted to an actuator arm. The "distal" end of a suspension or load beam is the end that is opposite the proximal end, i.e., the "distal" end is the cantilevered end.

Suspension 105 is coupled to an actuator arm 103, which in turn is coupled to a voice coil motor 108 that moves the suspension 105 arcuately in order to position the head slider over the correct data track on data disk 101 or other recording medium. The head slider is carried on a gimbal which allows the slider to pitch and roll so that it follows the proper data track on the disk, allowing for such variations as vibrations of the disk, inertial events such as bumping, and irregularities in the disk's surface. The gimbal and the flexible circuit are typically part of the suspension called the flexure.

Circuit integrated suspension (CIS) and trace suspension assembly (TSA) are known technologies for manufacturing flexures. These flexures typically have wiring trace impedances in the 50 to 100 ohm range. The wiring trace, also called the circuit trace or flexible circuit, electrically connects the slider and PZT components to control circuitry (not shown) of the hard disk drive. One portion of the wiring trace runs from slider contacts near the distal end of the suspension to the proximal end of the suspension. Another portion of the wiring trace runs from the PZTs to the proximal end of the suspension.

FIG. 2 is a side sectional view of a portion of a prior art suspension including a flexure circuit 10. A supporting layer 12 such as a stainless steel layer is coated with a dielectric layer 14 such as polyimide; conductive signal traces 16 and 18 such as copper or copper alloy are metalized on the polyimide layer; and a cover coat or coverlayer 20 of an insulator such as polyimide is applied over the copper traces 16, 18 and the insulating dielectric layer 14.

Circuit traces manufactured using CIS and TSA flexure technologies can have trace impedances in the 40-50 ohm range and a circuit bandwidth of over 6 GHz. However, the spacing between traces and the ground layer that can be manufactured using these technologies is limited. Consequently, flexures manufactured using these technologies are not expected to be able to meet future hard disk drive requirements that call for an impedance of less than 30 ohms along with a bandwidth of over 6 GHz.

Known techniques such as the use of interleaved traces or stacked traces can achieve impedances below 50 ohms. For example, a stack trace design can be constructed by adding an additional layer on top of the first circuit layer. Such designs have significant bandwidth limitations, however. For example, simulations have indicated that the stack trace design may be limited to a bandwidth of less than 3 GHz. In addition, simulations have indicated that the interleave trace design may be limited to a bandwidth of less than 7 GHz. Consequently, interleave trace designs and stack trace designs are not an optimal choice for future hard disk drive designs, such as designs for suspensions for 3.5 inch disks, that call for an impedance below 50 ohms along with a bandwidth of 8 GHz for a circuit having a length of 50 mm.

SUMMARY OF THE INVENTION

According to the invention, a suspension includes a circuit trace formed by circuit layers on each side of a conductive metal layer such as a stainless steel layer. The stainless steel layer is constructed with one or more windows, e.g., holes, such that traces of the circuit layers pass over the window(s). Consequently, when the traces carry a signal, an electric field generated by the signal will pass between the traces via the window(s). Due to the increased coupling of the electric fields between traces caused by the windowing, the traces exhibit a relatively high bandwidth and low impedance.

The disclosed circuit trace may be particularly beneficial for routing differential signals. The positive and negative traces of a differential signal pair are constructed such that they take complementary paths on opposite sides of the windowed stainless steel layer. Thus, the electric fields of differential signals carried by the differential trace pair will readily couple since the electric fields are able to pass through the window(s) in the stainless steel layer.

Exemplary embodiments of the invention will be further described below with reference to the drawings, in which like numbers refer to like parts. The drawing figures might not be to scale, and certain components may be shown in generalized or schematic form and identified by commercial designations in the interest of clarity and conciseness.

DETAILED DESCRIPTION OF THE PREFERRED EMBODIMENTS

Figure 1:
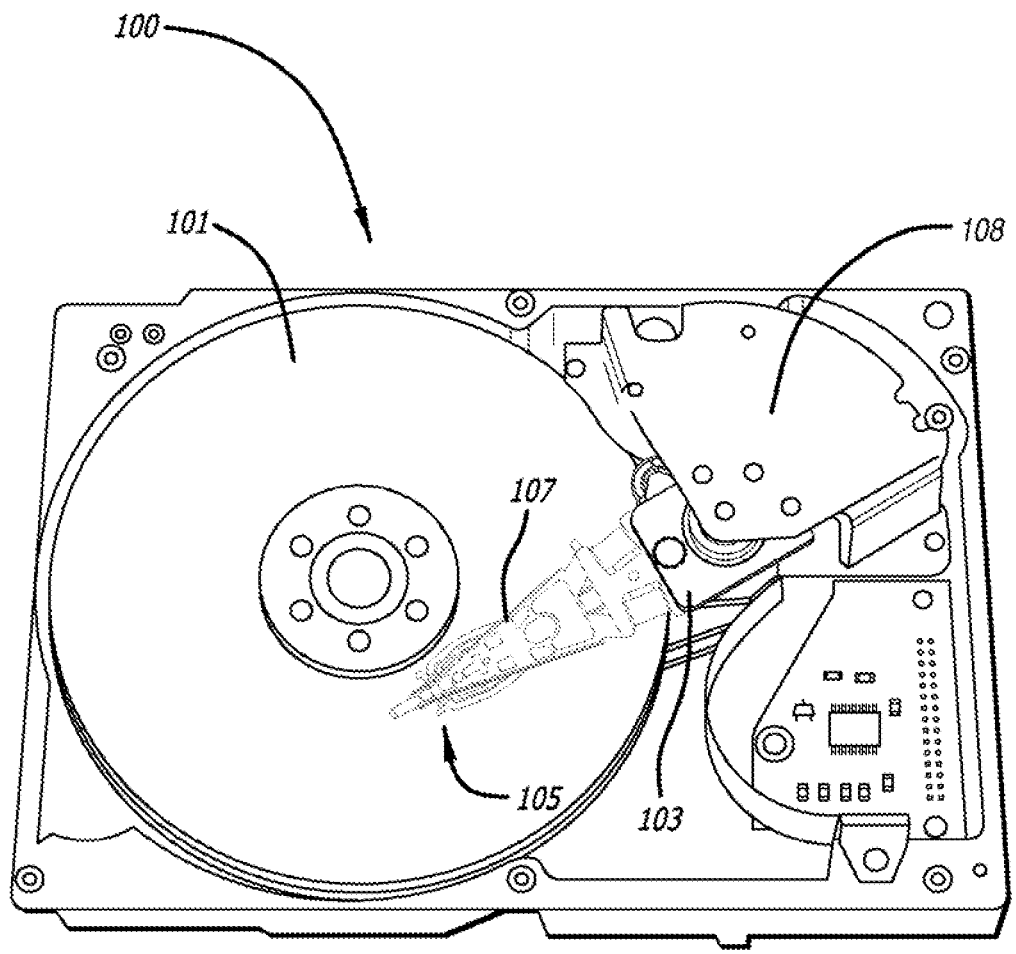
FIG. 1 is an oblique view of a prior art disk drive having a dual stage actuated suspension.
Figure 2:
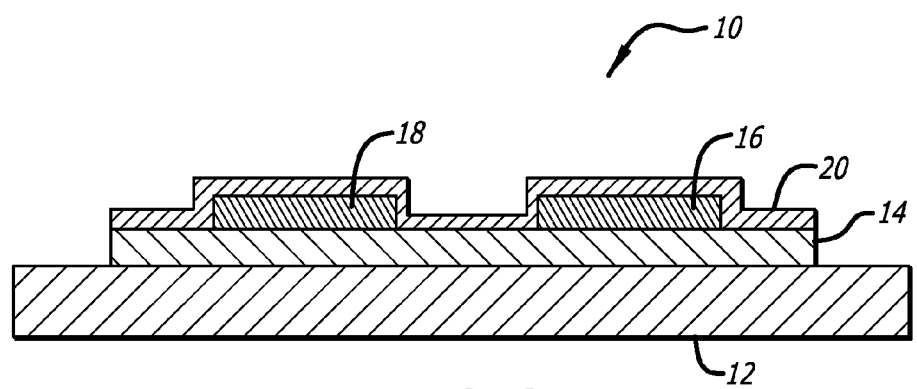
FIG. 2 is a side sectional view of a portion of a prior art suspension including a circuit trace.
Figure 3:
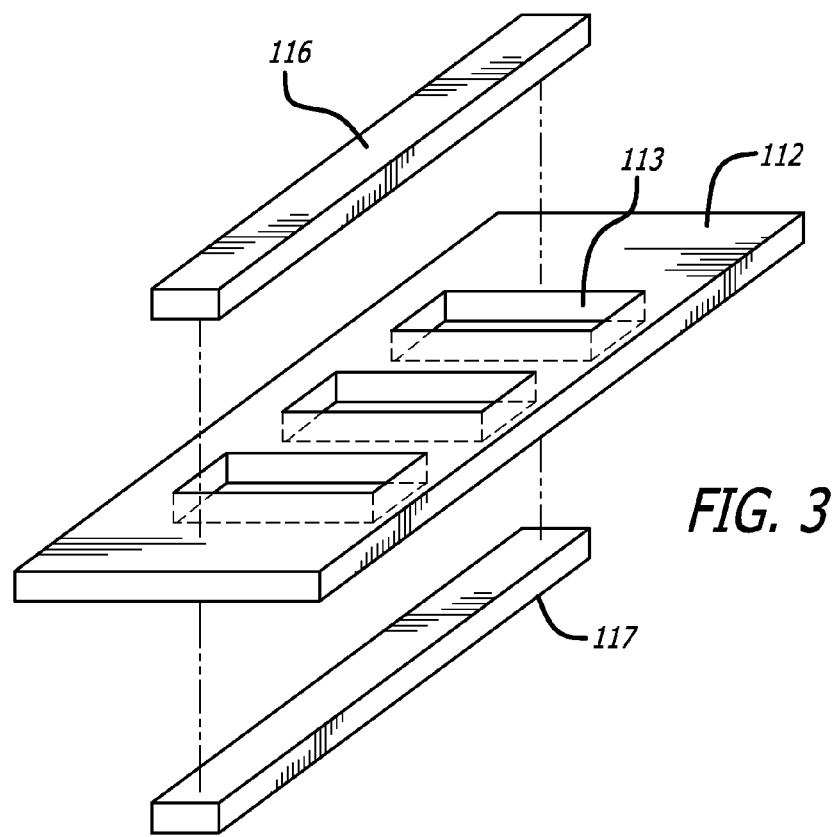
FIG. 3 is an exploded view of a suspension circuit according to an illustrative embodiment of the invention.

FIG. 3 is an exploded view of a suspension circuit 110 according to an illustrative embodiment of the invention, showing only the conductive metal layer 112 such as stainless steel, windows 113 formed therein, and conductive signal traces 116 and 117 such as copper or copper alloy signal traces. A stacked trace design is employed whereby a first circuit layer and a corresponding circuit trace 116 are constructed above stainless steel layer 112 and a second circuit layer and corresponding circuit trace 117 are constructed below stainless steel layer 112. The insulating layers, namely the dielectric layer 114 and the insulating coverlayers 20 and 21, are omitted for clarity of illustration. Those layers are depicted in FIGS. 5-6.

Figure 4:
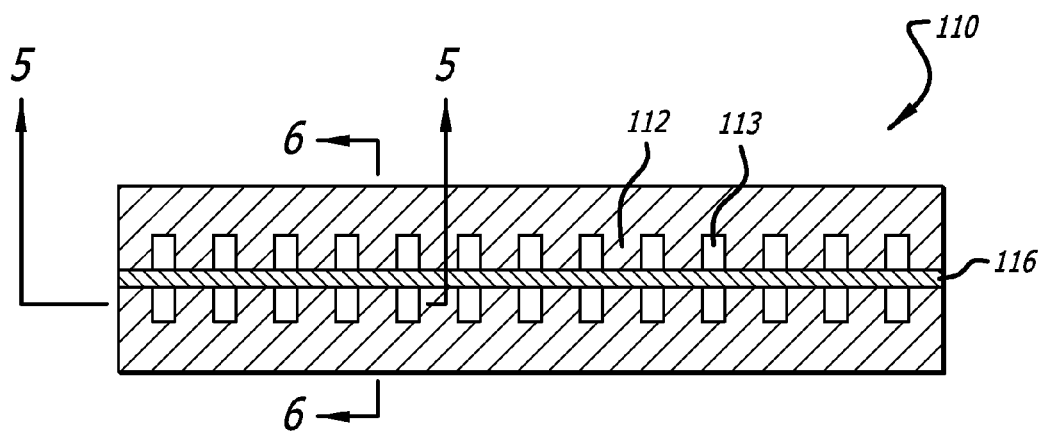
FIG. 4 is a top plan view of the circuit of FIG. 3.

FIG. 4 is a top plan view of the circuit of FIG. 3 with dielectric layer 114 and coverlayer 20 omitted for clarity of illustration. Windows 113 in stainless steel layer 112 are preferably regularly located and evenly spaced underneath circuit trace 116. The percentage of windowing, or the duty cycle of the windowing, can be defined as the length of run of circuit trace 116 below which there is a window 113, i.e., below which there is no stainless steel 112, divided by the total run length of the trace. FIG. 4, for example, shows slightly less than 50% windowing, i.e., with stainless steel under slightly more than half of the run length of circuit trace 116 along at least a particular section.

Figure 5:
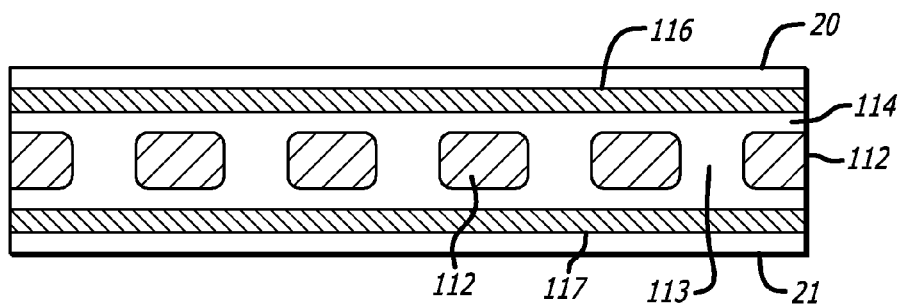
FIG. 5 is a sectional view of the circuit of FIG. 4 taken along section line 5-5.

FIG. 5 is a sectional view of the circuit of FIG. 4 taken along section line 5-5. The figure shows stainless steel layer 112, windows 113 formed in the stainless steel, polyimide or other dielectric 114, circuit traces 116 and 117 above and below stainless steel layer 112, respectively, and top and bottom protective insulating coverlayers 20 and 21. Polyimide 114 fills windows 113.

Figure 6:
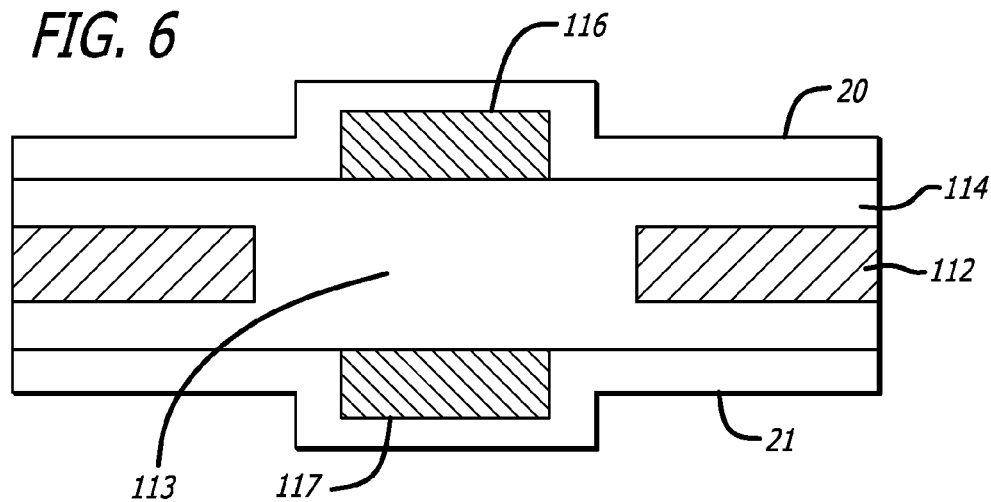
FIG. 6 is a sectional view of the circuit of FIG. 4 taken along section line 6-6.

FIG. 6 is a sectional view of the circuit of FIG. 4 taken along section line 6-6. Window 113 located between top and bottom traces 116, 117 allows the electric fields between those traces to couple, thus decreasing the differential impedance of that differential trace pair.

Returning to FIG. 3, copper traces 116 and 117 are disposed on opposite sides of stainless steel layer 112. Typically circuit 110 is part of the suspension's flexure, and typically stainless steel layer 112 is grounded such that layer 112 defines a ground plane. More generally, traces 116, 117 are located on opposite sides of some grounded suspension component, which could be metal support layer for the flexure, a load beam, or other grounded component. Additionally, the invention applies whether metal layer 112 is grounded or is held at some other constant potential such as a voltage, in which case metal layer 112 could be a voltage source plane. In addition, stainless steel layer 112 provides mechanical support for the circuit. Dielectric layer 114 immediately above and below stainless steel layer 112 as seen in FIGS. 4-6 acts as a dielectric standoff, preventing copper signal traces 116 and 117 from shorting to the grounded stainless steel layer 112 and maintaining those copper signal traces at the desired distance away from each other and away from ground plane 112. The distance between traces 116 and 117 both within the windowed area and within the non-windowed area substantially equals the sum of the respective nominal thicknesses of the stainless steel layer 112, the insulating dielectric layer above layer 112, and the insulating dielectric layer below layer 112. That separation distance between the traces remains approximately constant as the traces pass throw the windowed areas and the non-windowed areas. The lengths and widths of windows 113, and their duty cycles are chosen to achieve the desired differential impedance and bandwidth of the signal traces 116, 117. The signal traces 116, 117 alternatingly extend over a number of windowed areas and a number of non-windowed areas.

Typically signal traces 116 and 117 will carry opposite polarities of a differential signal pair, although signal traces 116 and 117 could carry single-ended signals. In the case of single-ended signals, it might be desirable to offset signal traces 116 and 117 transversely such that the signal do not extend directly over and under each other, separating them by a greater distance from each other than if they extended directly over and under each other, thus reducing cross coupling between signals.

To reduce the complexity of FIGS. 3-6, only a single copper trace is shown for each circuit layer. It should be appreciated, however, that a circuit layer of a typical suspension will have multiple traces, and hence the circuit would include multiple configurations of such signal trace pairs.

The thickness of the stainless steel layer 112 provides a relatively wide spacing between the stacked traces 116, 117 of the circuit layers. Consequently, circuit 110 can exhibit a relatively low impedance, such as less than 30 ohms.

Windows 113, i.e., holes, are formed in the stainless steel layer 112 to enable electric fields between the two circuit layers to couple. In FIG. 3, a window 113 is defined by the absence of stainless steel 112 between the two stainless steel sections. To reduce the complexity of FIG. 3, three windows are shown. It should be appreciated, however, that a circuit layer of a typical suspension may have many such windows.

Through the use of ground layer windowing as illustrated in FIGS. 3-6, the resulting circuit can exhibit a relatively high bandwidth and a relatively low impedance. For example, the circuit may exhibit a bandwidth of 6 GHz or higher along with an impedance of 50 ohms or lower.

Figure 7:
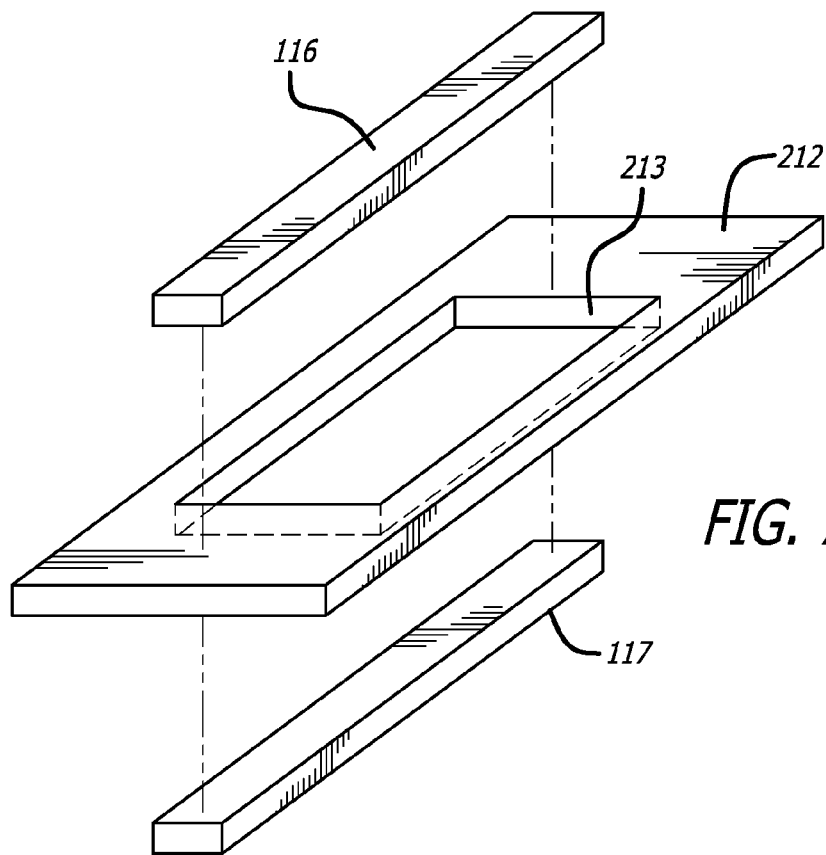
FIG. 7 is an exploded view of a suspension circuit similar to FIG. 3 with a larger window.

FIG. 7 is an exploded view of a stainless steel layer 212 and traces 116, 117 above and below, with a relatively large window 213 formed in stainless steel layer 212. The dielectric layer and coverlayers are omitted for clarify of illustration. FIG. 7 can be thought of as the circuit of FIG. 3 in which the percentage of windowing has been increased to over 90%, and to nearly 100%, or equal to 100%.

Figure 8:
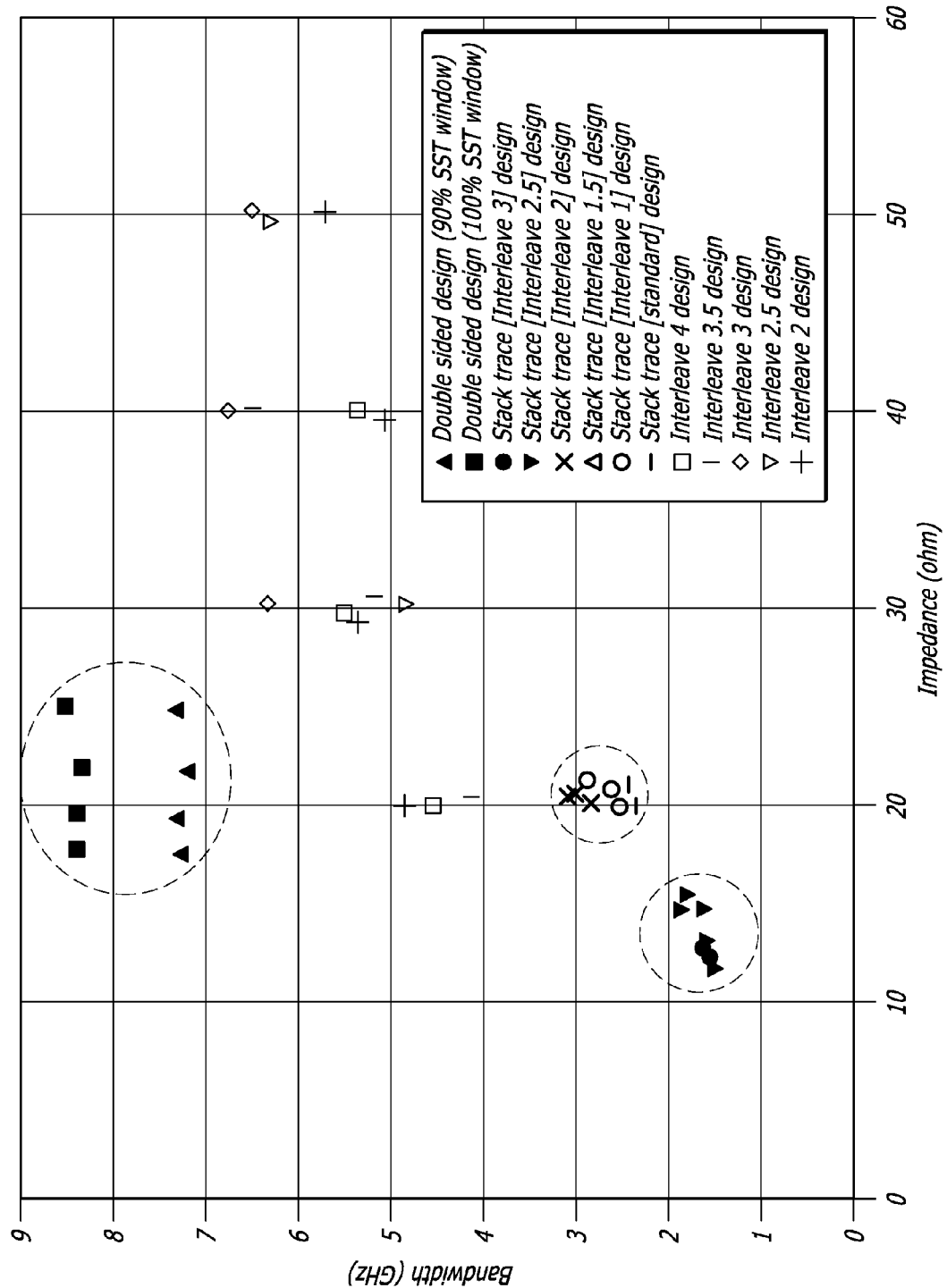
FIG. 8 is a graph comparing impedance and bandwidth of the circuit trace design of FIG. 3 with impedance and bandwidth of prior art stacked trace and interleaved trace designs according to a simulation.

FIG. 8 is a graph comparing impedance and bandwidth of the circuit trace design of FIGS. 3-7 with impedance and bandwidth of stacked trace and interleaved trace designs according to simulations. Of particular note is the improved performance for the double sided design of the present invention, highlighted via a dashed circle in the upper part of the figure, as compared to prior art stacked and/or interleaved traces, shown in smaller dashed circles toward the bottom of the figure, which exhibit low impedance but also relatively low bandwidth. As indicated, a circuit trace design as taught herein employing stainless steel windowing of 90% exhibits a bandwidth greater than 7 GHz and an impedance less than 30 ohms. Moreover, a circuit trace design as taught herein employing stainless steel windowing of 100% exhibits a bandwidth greater than 8 GHz and an impedance less than 30 ohms.

The percentage of windowing referred to above is inversely proportional to the percentage of stainless steel that lies between the two stacked traces. For example, in some implementations, stainless steel windowing of 100% means that there is no stainless steel between a pair of stacked traces for the entire run of the stacked traces. As another example, in some implementations, stainless steel windowing of 90% means that there is no stainless steel between a pair of stacked traces for 90% of the run of the stacked traces. Other percentages of windowing, such as 50%, 20%, and so on, may be employed in various implementations.

Figure 9A:
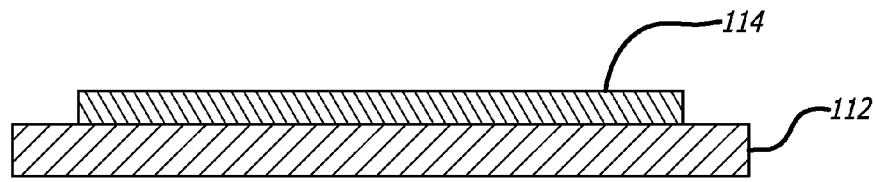
FIGS. 9A-9E illustrate a process for manufacturing the circuit traces of FIGS. 3-7 according to an illustrative embodiment of the invention.
Figure 9B:
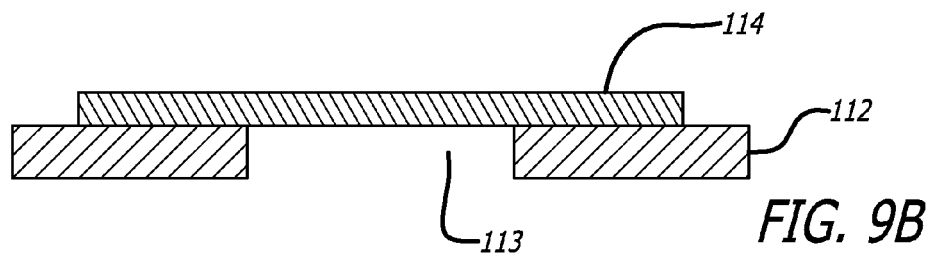
Figure 9C:
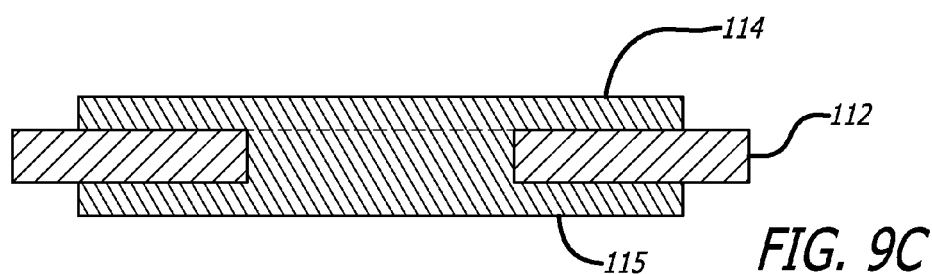
Figure 9D:
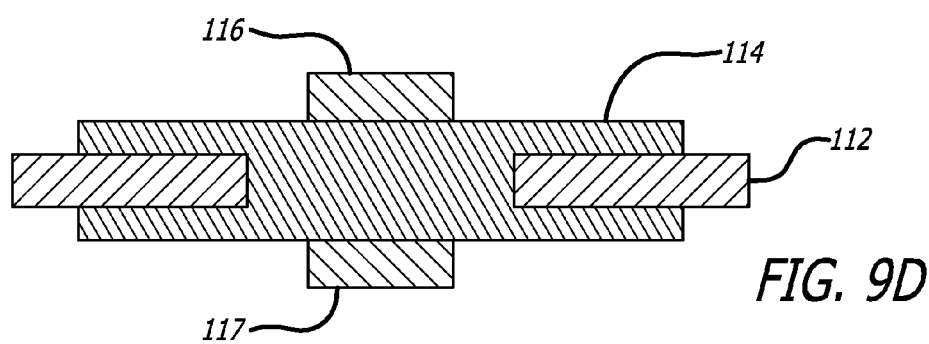
Figure 9E:
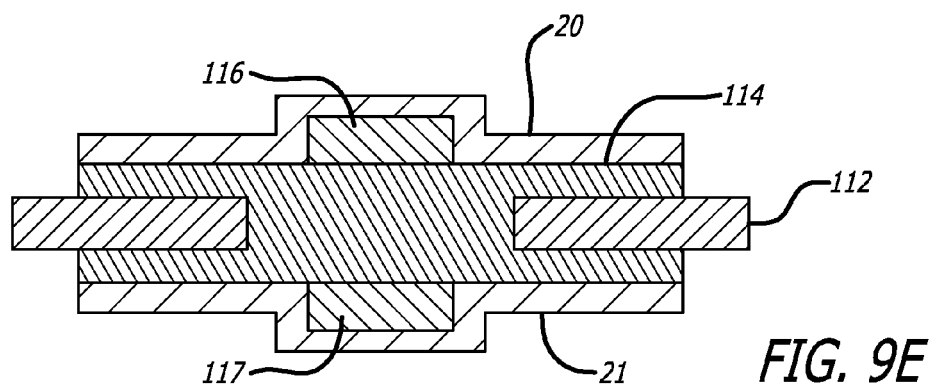

FIGS. 9A-9E illustrate a process for manufacturing the circuits of FIGS. 3-7 according to an illustrative embodiment of the invention. The individual process steps described below and variations on those steps are by themselves well known and therefore will not be described in detail. In FIG. 9A top side polyimide 114 is coated, imaged, or developed onto a top surface of stainless steel 112. Next, in FIG. 9B one or more windows 113 are etched or otherwise formed into the stainless steel 112. In FIG. 9C bottom side polyimide 115 is then coated, imaged, or developed onto a bottom surface of the stainless steel 112. Polyimide 114 fills window(s) 113 in the stainless steel 112 such that the bottom side polyimide 115 and the top side polyimide 114 contact one another. In FIG. 9D a chromium and copper (Cr/Cu) composition is sputtered onto the top and bottom polyimide 114, 115 as a seed layer to enable subsequent plating, and copper signal traces 116, 117 are then electrodeposited onto the top polyimide layer 114 and 115. In FIG. 9E polyimide coverlayers 20 and 21 are then coated, imaged, or developed onto the top and bottom surfaces, respectively, of the assembly. For any copper traces 116, 117 requiring gold plating such as where those traces will be exposed to air and used as contact pads, gold (not shown) is plated onto the copper traces. The resulting assembly may then be bonded to other suspension components to form a completed suspension.

It will be understood that terms such as "top," "bottom," "above," and "below" as used within the specification and the claims herein are terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

Although the present invention has thus been described in detail with regard to the preferred embodiments and drawings thereof, it should be apparent to those skilled in the art that various adaptations and modifications of the present invention may be accomplished without departing from the spirit and the scope of the invention. Different materials and different process steps maybe employed to reach the same result. The percentage of windowing can be continuously varied from 0% to 100% for any of the embodiments shown and described. Other variations are possible. Accordingly, it is to be understood that the detailed description and the accompanying drawings as set forth hereinabove are not intended to limit the breadth of the present invention, which should be inferred only from the following claims and their appropriately construed legal equivalents.

We claim:

1. A suspension for a disk drive, the suspension having an electrical circuit and support for the circuit comprising:
   a grounded metal layer, the grounded metal layer providing mechanical support for the circuit;
   a first insulation layer on the grounded metal layer;
   a first conductive signal trace on the first insulation layer;
   a second insulation layer underneath the grounded metal layer; and
   a second conductive signal trace underneath the second insulation layer and underneath the first conductive signal trace, the first and second conductive signal traces together carrying a differential signal pair;
   wherein:
   the grounded metal layer has at least one window formed therein;
   the first and second conductive signal traces extend above and below the window, respectively; and
   the window is filled with an insulating material.

2. The suspension of claim 1 wherein the at least one window defines at least 90% windowing along a trace path defined by the conductive traces.

3. The suspension of claim 1 wherein the windowed and non-windowed areas collectively define at least 50% windowing along a trace path defined by the conductive signal traces.

4. The suspension of claim 1 wherein the grounded metal layer comprises stainless steel.

5. The suspension of claim 1 wherein the first and second insulation layers comprise polyimide.

6. The suspension of claim 1 wherein the first and second conductive signal traces comprise copper.

7. The suspension of claim 1 wherein the grounded metal layer comprises a flexure layer.

8. The suspension of claim 1 wherein:
   the grounded metal layer, the first insulation layer, and the second insulation layer all have respective nominal thicknesses associated therewith;
   an area in which the first and second conductive signal traces are disposed above and below the window defines a windowed area; and
   within the windowed area the first and second conductive signal traces are separated by a distance that substantially equals the sum of the respective nominal thicknesses of the grounded metal layer, the first insulation layer, and the second insulation layer.

9. The suspension of claim 8 wherein the differential signal pair has a differential impedance of less than 30 ohms.

10. The suspension of claim 8 wherein the differential signal pair has a bandwidth of at least 7 GHz.

11. The suspension of claim 1 wherein:
   the at least one window in the grounded metal layer comprises multiple windows therein defining multiple windowed areas; and
   the first and second conductive signal traces alternatingly extend over a plurality of windowed areas in the grounded metal layer and a plurality of non-windowed areas in the grounded metal layer.

12. The suspension of claim 11 wherein the first and second conductive signal traces remain separated by approximately a constant separation distance as they pass through said windowed and non-windowed areas.

13. A suspension for a disk drive, the suspension having a flexible electrical circuit comprising:
   a first signal trace on top of a second signal trace, the first and second signal traces being disposed on opposite sides of a grounded suspension component, the first and second signal traces carrying a differential signal pair;
   wherein:
   the first signal trace and the second signal trace are each separated from the grounded suspension component by an insulating material;
   the grounded suspension component has at least one window formed therein;

the window is filled with the insulating material;

the first and second signal traces extend respectively over and under the grounded suspension component and the window formed therein.

14. The suspension of claim 13 wherein:

the insulating material comprises polyimide; and the grounded suspension component comprises stainless steel.

15. The suspension of claim 13 wherein the grounded suspension component comprises a load beam.

16. The suspension of claim 13 wherein the grounded suspension component comprises a flexure layer.

17. The suspension of claim 13 wherein the first and second signal traces have no grounded suspension component between them for at least 90% of their respective lengths.

18. The suspension of claim 13 wherein the first and second signal traces extend in a plurality of areas defining non-windowed areas in which the traces have the grounded suspension component between them, and in a plurality of areas defining windowed areas in which the traces do not have the grounded suspension component between them, the traces extending through areas that alternate between being windowed areas and non-windowed areas.

19. The suspension of claim 18 wherein the alternating windowed areas and non-windowed areas define at least 50% windowing between the signal traces.

* * * * *